US010186976B2

(12) United States Patent
Duvnjak

(10) Patent No.: US 10,186,976 B2
(45) Date of Patent: Jan. 22, 2019

(54) PEAK SWITCHING AND OPTIMAL SR DRIVE TIMING CONTROL

(71) Applicant: Power Integrations, Inc., San Jose, CA (US)

(72) Inventor: Rajko Duvnjak, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/651,309

(22) Filed: Jul. 17, 2017

(65) Prior Publication Data

US 2018/0358902 A1 Dec. 13, 2018

Related U.S. Application Data

(60) Provisional application No. 62/518,184, filed on Jun. 12, 2017.

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0058* (2013.01)

(58) Field of Classification Search
None
See application file for complete search history.

(56) References Cited

U.S. PATENT DOCUMENTS

| 2004/0136209 | A1* | 7/2004 | Hosokawa | H02M 3/33592 363/24 |
| 2007/0008757 | A1* | 1/2007 | Usui | H02M 3/33507 363/125 |
| 2011/0205763 | A1* | 8/2011 | Artusi | H02M 1/4225 363/21.06 |
| 2012/0081927 | A1* | 4/2012 | Matsumoto | H02M 3/33523 363/21.05 |
| 2016/0111961 | A1 | 4/2016 | Balakrishnan et al. | |
| 2016/0233779 | A1* | 8/2016 | Cohen | H02M 3/33592 |
| 2017/0033698 | A1* | 2/2017 | Vemuri | H02M 3/33592 |

\* cited by examiner

*Primary Examiner* — Jeffrey A Gblende
(74) *Attorney, Agent, or Firm* — Christensen O'Connor Johnson Kindness PLLC

(57) ABSTRACT

A controller includes a first control circuit coupled to an input side of a power converter. The first control circuit includes a timing and delay circuit and a switch selection circuit. A second control circuit is coupled to an output side of the power converter. The second control circuit includes a valley detection circuit and a synchronous rectifier control circuit. A third control circuit is coupled to the input side of the power converter. The third control circuit is coupled to drive an auxiliary switch coupled to an input side of an energy transfer element. The first control circuit is coupled to alternately drive a main switch, which is coupled to the input side of the energy transfer element, and the auxiliary switch in response to a command signal to transfer energy from the input side to the output side of the energy transfer element to drive a load.

13 Claims, 6 Drawing Sheets

PEAK SWITCHING AND OPTIMAL SR DRIVE TIMING CONTROL

CROSS-REFERENCE TO RELATED APPLICATIONS

This application claims priority under 35 U.S.C. 119(e) to U.S. Provisional Application No. 62/518,184, filed on Jun. 12, 2017, which is incorporated herein by reference in its entirety.

BACKGROUND INFORMATION

Field of the Disclosure

This application relates generally to flyback converters and more specifically the invention relates to zero voltage switching (ZVS) flyback converters.

Background

Switch mode power converters are widely used for household or industrial appliances that require a regulated direct current (dc) source for their operation, such as for example battery chargers that are commonly used in electronic mobile devices. Off-line ac-dc converters convert a low frequency (e.g., 50 Hz or 60 Hz) high voltage ac (alternating current) input voltage to a required level of dc output voltage. Various types of switch mode power converters are popular because of their well regulated output, high efficiency, and small size along with their safety and protection features.

Safety requirements for isolated switch mode power converters generally require the use of high frequency transformers to provide galvanic isolation between the inputs and outputs of the switch mode power converters in addition to the voltage regulation at the output. Popular topologies of isolated switch mode power converters may include flyback, forward, isolated half/full bridge, among many others including resonant types.

One source of loss in switch mode power supplies is the switching loss during turn on and turn off of the power switch. In an isolated switch mode power converter High Frequency (HF) turn off oscillations may happen due to resonance between the leakage inductance of the transformer and the output capacitance of the power switch (e.g., total parasitic capacitance across the power MOSFET). In discontinuous current mode DCM operation of an isolated switch mode power converter, in addition to above mentioned HF turn off oscillations, a second lower frequency oscillation may also happen between the magnetic inductance of the transformer and the output capacitance of the power switch. This second lower frequency oscillation may often be referred to as relaxation ringing.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
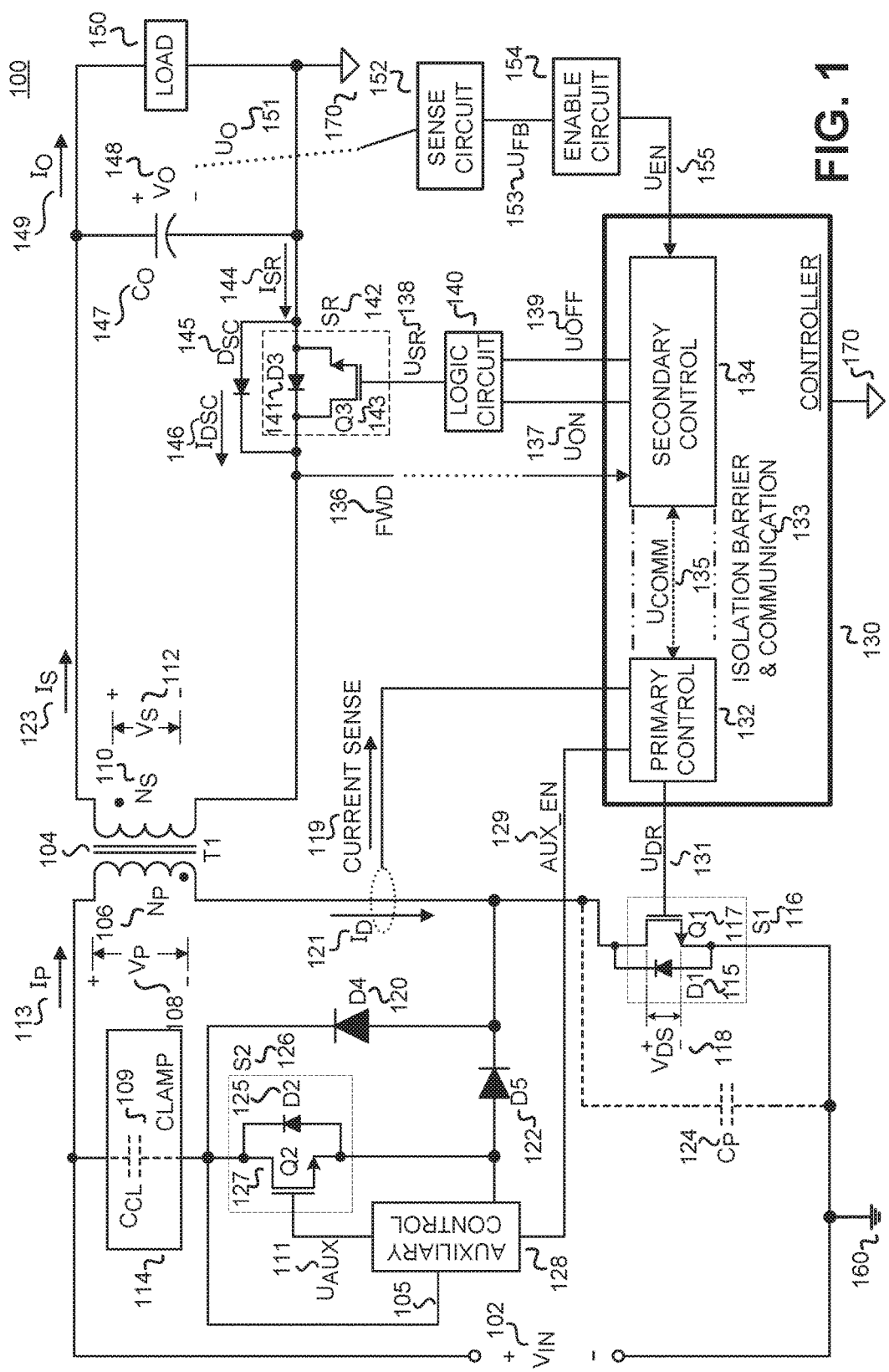
FIG. 1 shows an example implementation of a Zero Voltage Switching (ZVS) flyback converter including an auxiliary switch coupled in a configuration, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As mentioned above, isolation is often provided in switch mode power converters using external isolation components such as, for example an opto-coupler or through an extra bias (e.g., feedback) winding on the transformer core that is magnetically coupled to the secondary winding. Some products and applications may require low output voltages, such as for example 5V and below. In these low voltage cases, synchronous rectification may be utilized to achieve high efficiency and also a compact form factor. Synchronous rectification replaces an output rectifier diode with synchronized rectifier switch (e.g., a MOSFET) that is switched to behave like a rectifier to reduce voltage drop and power loss. In one example, an input controller on the input side of a synchronous flyback switch mode power converter controls the input power switch in reference to an input ground reference. In one example, the input controller circuit and input side switch may be implemented with a monolithic or hybrid structure in the input controller IC. Continuing with this example, a secondary controller on the secondary side of the synchronous flyback switch mode power converter controls the synchronized rectifier switch in reference to an output ground reference. The switching action of the synchronized rectifier switch is synchronized with switching of the input side switch with well-controlled isolated gating signals.

A secondary controller for a flyback converter may provide tighter output regulation and faster response to load transients. However, as discussed previously, conventional methods of output control often use external isolation devices, such as for example opto-couplers. The input and output controllers, even though referenced to different grounds, should still be able to reliably communicate between themselves, such as through a magnetic coupling between the input and output controllers. As used herein a "ground" or "ground reference" may refer to a reference point in an electrical circuit from which voltages are measured, a common return path for electric current, or a direct physical connection to the Earth.

In operation of an example synchronous flyback power converter, during an off time period of the input side switch, the output rectifier is conducting (e.g., transferring energy to the output). Also during this off time period, the secondary output voltage reflects onto the input side and adds up to the input voltage across the switch. During Continuous Conduction Mode (CCM) the secondary rectifier is still conducting when the input side switch turns back on. Thus, the voltage across input side switch is defined by $V_{in}+V_{OR}$, where $V_{in}$ is the input bus voltage (e.g., rectified line voltage) across the input winding and $V_{OR}$ is the output voltage reflected to the input side. To minimize switch turn on stress and reduce the switching loss, the reflected output voltage $V_{OR}$ should be as near as possible to $V_{in}$. However, in Discontinuous Conduction Mode (DCM) of operation, before the input side switch turns on, the secondary rectifier stops conducting and relaxation ringing due to the secondary parasitic inductance and capacitance happens. Each valley point of the relaxation ringing at secondary side presents a peak point of the reflected ring at the input side which provides a time at which the voltage across the input side auxiliary switch it at or near a minimum to reduce switching loss during turn on of the input side auxiliary switch.

The teachings of this invention are the circuits which improve overall efficiency of a Zero Voltage Switching (ZVS) flyback converter and reduce overall stress on the rectifiers in such converter.

In some configurations, power converters may have an auxiliary switch in addition to the primary switch (main switch) on the primary side. The auxiliary switch may be turned on or turned off in combination with the main switch. The use of the auxiliary switch in this way may help reduce the turn on losses of the main (primary) switch which may further improve the overall efficiency of a ZVS flyback converter. However, the auxiliary switch may also suffer from the turn on losses and further reduce the overall efficiency of the ZVS flyback converter. Turning on and turning off the auxiliary switch at an optimal time may help reduce the losses in the auxiliary switch.

Accordingly, the embodiments of the present disclosure provide a method and an apparatus to reduce losses on the auxiliary switch used in a Zero Voltage Switching (ZVS) flyback converter, reduce voltage stress on Sync Rectifiers, and prevent the cross conduction of the Sync Rectifiers in such converters. More specifically, the embodiments of the present disclosure provide a method and apparatus to turn on and turn off an auxiliary switch at an optimal time before turning on the main switch during every switching cycle (CCM or DCM) in a flyback converter. In particular, the embodiments disclosed herein teach turning on the auxiliary switch when the voltage across the input side switch it at or near a maximum (peak) to reduce the switching loss during turn on of the auxiliary switch. The auxiliary switch may be turned off after a predetermined delay before turning the main switch on. In other words, the embodiments disclosed herein teach alternately driving or controlling or turning on or turning off the main switch and the primary switch.

Furthermore, the embodiments of present disclosure teach a method and an apparatus to identify or detect a valley zone or a peak zone of operation for a power converter.

A further object of this invention is to teach an apparatus and a method to reduce the stress on the synchronous rectifier (SR) by coupling a diode in parallel with the SR and employ the control of the SR in accordance with teaching in this invention in order to reduce the stress on the SR.

Embodiments discussed herein are explained with respect to a ZVS flyback converter, however, those may be applicable to a ZVS flyback converter or isolated (e.g., synchronous flyback) or non-isolated (e.g., Buckboost) switch mode power converters where the output controller is referenced to a different ground and may communicate to the input controller to command the switching of the input side switch.

To illustrate, FIG. 1 shows an example power converter 100 including input $V_{IN}$ 102, an energy transfer element T1 104, a primary winding 106 of the energy transfer element T1 104, a secondary winding 110 of the energy transfer element T1 104, a first primary switch, also referred to as a main switch S1 116 (as transistor Q1 117 and body diode D1 115), input return 160, a clamp circuit 114, a second primary switch, also referred to as an auxiliary switch S2 126 (illustrated as transistor Q2 127 and diode D2 125), an auxiliary control circuit 128, diodes D4 120 and D5 122, an output capacitor C0 147, an output return 170, a load 150, a sense circuit 152, a synchronous rectifier (illustrated as Q3 143 and diode D3 141), a controller 130, and an logic circuit 140. Controller 130 further includes a primary control circuit 132 and a secondary control circuit 134 which are separated by an isolation barrier and communication link 133. The secondary control circuit 134 is coupled to transmit and receive a command signal $U_{COMM}$ 135 to the primary control circuit 132. As will be explained later in the specification, in one example, the main switch S1 116 or the auxiliary switch S2 126 may be turned on or turned off in response to the signal $U_{COMM}$ 135. In other examples the sense circuit 152 may also be included in controller 130.

FIG. 1 further illustrates an output voltage $V_O$ 148, an output current $I_O$ 149, an output quantity $U_O$ 151, a feedback signal $U_{FB}$ 153, a main switch current $I_D$ 121, a current sense signal 119, a primary drive signal $U_{DR}$ 131, an auxiliary drive signal $U_{AUX}$ 111 and an auxiliary enable signal AUX_EN 129. The example switched mode power converter 100 illustrated in FIG. 1 is coupled in a flyback configuration, which is just one example of a switched mode power converter that may benefit from the teachings of the present invention. It is appreciated that other known topologies and configurations of switched mode power converter may also benefit from the teachings of the present invention.

In the illustrated example, the power converter 100 provides output power to a load 150 from an unregulated input $V_{IN}$ 102. In one example, the input $V_{IN}$ 102 is a rectified and filtered ac line voltage. In another example, the input voltage $V_{IN}$ 102 is a dc input voltage. The input $V_{IN}$ 102 is coupled to the energy transfer element T1 104. In some examples, the energy transfer element T1 104 may be a coupled inductor. In other examples, the energy transfer element T1 104 may be transformer. In the example of FIG. 1, the energy transfer element T1 104 includes two windings, a primary winding 106 and secondary winding 110. $N_P$ and $N_S$ are the number of turns for the primary winding 106 and secondary winding 110, respectively. In the example of FIG. 1, primary winding 106 may be considered an input winding, and secondary winding 110 may be considered an output winding. The primary winding 106 is further coupled to power switch S1 116, which is then further coupled to the input return 160. In addition, the clamp circuit 114 is coupled across the primary winding 106 of the energy transfer element T1 104 through an auxiliary switch S2 126. In one example, the clamp circuit may include a clamp capacitor $C_{CL}$ 109. FIG. 1 also illustrates a parasitic capacitance $C_P$ 124 that may exist across the main switch S1 116.

The secondary winding 110 of the energy transfer element T1 104 is coupled to the synchronous rectifier SR 142, exemplified as transistor Q3 143 with a body diode D3 141. Also shown in FIG. 1 is the quantity $I_{SR}$ 144 which represents current through the SR 142. The secondary control circuit 134 included in the controller 130 is utilized to control the turning ON and OFF of the transistor. In other examples, sense circuit 152 may be included in the controller 130.

As shown in the depicted example, the output capacitor $C_O$ 147 and the load 150 are coupled to the SR 142. An output is provided to the load 150 and may be provided as either an output voltage $V_O$ 148, output current $I_O$ 149, or a combination of the two.

The power converter 100 further includes circuitry to regulate the output, which is exemplified as output quantity $U_O$ 151. A sense circuit 152 is coupled to sense the output quantity $U_O$ 151 and to provide feedback signal $U_{FB}$ 153, which is representative of the output quantity $U_O$ 151. Feedback signal $U_{FB}$ 153 may be voltage signal or a current signal. In one example, the sense circuit 152 may sense the output quantity from an additional winding included in the energy transfer element T1 104. In another example, there may be a galvanic isolation (not shown) between the controller 130 and the sense circuit 152. The galvanic isolation could be implemented by using devices such as an opto-coupler, a capacitor or a magnetic coupling. In a further example, the sense circuit 152 may utilize a voltage divider to sense the output quantity $U_O$ 151 from the output of the power converter 100. In general, the output quantity $U_O$ 151 is either an output voltage $V_O$ 148, output current $I_O$ 149, or a combination of the two.

As shown in the depicted example, an enable circuit 154 is coupled to sense circuit 152 and receives feedback signal $U_{FB}$ 153 representative of the output of power converter 100 from the sense circuit 152. Enable signal $U_{EN}$ 155 may be a voltage signal or a current signal. In one example, enable signal $U_{EN}$ 155 is also representative of the output of the power converter 100 and provides information to the controller 130 to enable or disable the power switch S1 116 or S2 126. As shown in the depicted example, the controller 130 receives feedback signal $U_{FB}$ 153 representative of the output of power converter 100 from the sense circuit 152. The enable signal $U_{EN}$ 155, which in one example may be rectangular pulse waveform with varying lengths of logic high and logic low sections. In another example, the enable signal $U_{EN}$ 155 may be a logic or digital signal.

The controller 130 further includes terminals for receiving the current sense signal 119 and for providing the drive signal $U_{DR}$ 131 to power switch S1 116. The current sense signal 119 may be representative of the switch current $I_D$ 121 in the primary switch S1 116. Current sense signal 119 may be a voltage signal or a current signal. In addition, the controller 130 provides drive signal $U_{DR}$ 131 to the power switch S1 116 to control various switching parameters to control the transfer of energy from the input of power converter 100 to the output of power converter 100. Examples of such parameters may include switching frequency, switching period, duty cycle, or respective ON and OFF times of the power switch S1 116.

In the example of FIG. 1, input voltage $V_{IN}$ 102 is positive with respect to input return 111, and output voltage $V_O$ 148 is positive with respect to output return 170. In the example illustrated in FIG. 1, the input return 160 is galvanically isolated from the output return 170. In other words, a dc voltage applied between input return 160 and output return 170 will produce substantially zero current. Therefore, circuits electrically coupled to the primary winding 106 are galvanically isolated from circuits electrically coupled to the secondary winding 110. For example, galvanic isolation could be implemented by using an opto-coupler, a capacitive coupler or a magnetic coupler between the controller 130 and the enable circuit 154 or between the enable circuit 154 and the sense circuit 152. In one example, the power converter 100 of FIG. 1 provides regulated output power to the load 150 from an unregulated input $V_{IN}$ 102. The power converter 100 utilizes the energy transfer element T1 104 to transfer energy between the primary 106. The auxiliary control circuit 128 is coupled to output an auxiliary drive signal $U_{AUX}$ 111 to drive the auxiliary switch in response to the auxiliary enable signal AUX_EN 129. The signal $U_{AUX}$ 111 is coupled to the gate of the transistor Q2 127. In one example, the drain of the transistor Q2 127 is coupled the cathode of the diode D4 120, the anode of the diode D4 120 is coupled to the cathode of the diode D5 122, and the anode of the diode D5 122 is coupled to the auxiliary control circuit 128. The auxiliary control circuit 128 is also coupled to the drain of the transistor Q2 127 via a signal 105.

In one example the transistors Q1 117 and Q2 127 may be metal oxide semiconductor field effect transistors (MOSFET) or a bipolar junction transistors (BJT) or insulated gate bipolar transistors (IGBT) or other suitable switches. The primary controller 130 and the primary switch S1 116 may be integrated. In one example, the transistors Q1 117 and Q2 127 may be S1 MOSFETs. In one example, the diodes D4 120 and D5 122 are coupled to the auxiliary switch Q2 127 to help improve the poor reverse recovery of the of the body diode D2 125 of the Q2 127. It may be appreciated by those of ordinary skill in the art that the diodes a D4 120 and D5 122 coupled as shown in FIG. 1, may help prevent the flow of current through the body diode D2 125 of the Q2 127.

In accordance with the teachings of the present invention, the auxiliary switch S2 126 is turned on and off during every switching cycle of the power converter 100 before turning on the main switch S1 116 in response to a command signal $U_{COMM}$ 135. In one example, the signal $U_{COMM}$ 135 may be a rectangular pulse waveform or logic signal. In one example, primary control circuit 132 may make the signal $U_{DR}$ 131 or signal AUX_EN 129 high, in response to a logic high value of the signal $U_{COMM}$ 135. A high value of the signal $U_{DR}$ 131 may turn on the primary switch 116 and a low value of the signal $U_{DR}$ 131 may turn off the primary switch 116. A high value of the signal AUX_EN 129 may enable the auxiliary control circuit 128 to make the signal $U_{AUX}$ 111 to turn on the auxiliary switch S2 126 and a low value of the signal AUX_EN 129 may disable the auxiliary control circuit 128. Similarly, a high value of the signal $U_{AUX}$ 111 may turn on the auxiliary switch S2 126 and a low value of the signal $U_{AUX}$ 111 may turn off the auxiliary switch S2 126. In other examples, there may be other logic circuits implemented external to the controller 130 to drive the primary switch S1 116. Similarly, in other examples there may be other logic circuits implemented external to the auxiliary control circuit 128 to drive the auxiliary switch S1 116.

In one example, the secondary control circuit 134 is coupled to output signals $U_{ON}$ 137 and $U_{OFF}$ 139 to a logic circuit 140. The logic circuit 140, (details of which are shown) is coupled to output a signal $U_{SR}$ 138 to drive the SR 142. In one example, the signal $U_{ON}$ 137 turns the SR 142 on and the signal $U_{OFF}$ 139 turns the SR 142 off. In other examples, there may be some logic used to drive the SR 142. The logic circuit 140 may include any combination of digital logic gates to drive the signal SR 142 high or low. In some examples, the logic circuit may be integrated with the secondary control circuit 134.

The transistor Q3 143 may be a MOSFET, or a BJT, or an IGBT or any other suitable switching element. The Schottky diode $D_{SC}$ 145 is coupled across the transistor Q3 143 in accordance with the teachings of the present invention. In one example, during the time when the SR 142 is turned off, the secondary current $I_S$ 123 flows through the Schottky diode $D_{SC}$ 145. In one example, the current $I_{DSC}$ 146 is substantially equal to the secondary current $I_S$ 123 when the SR 142 is off.

Figure 2:
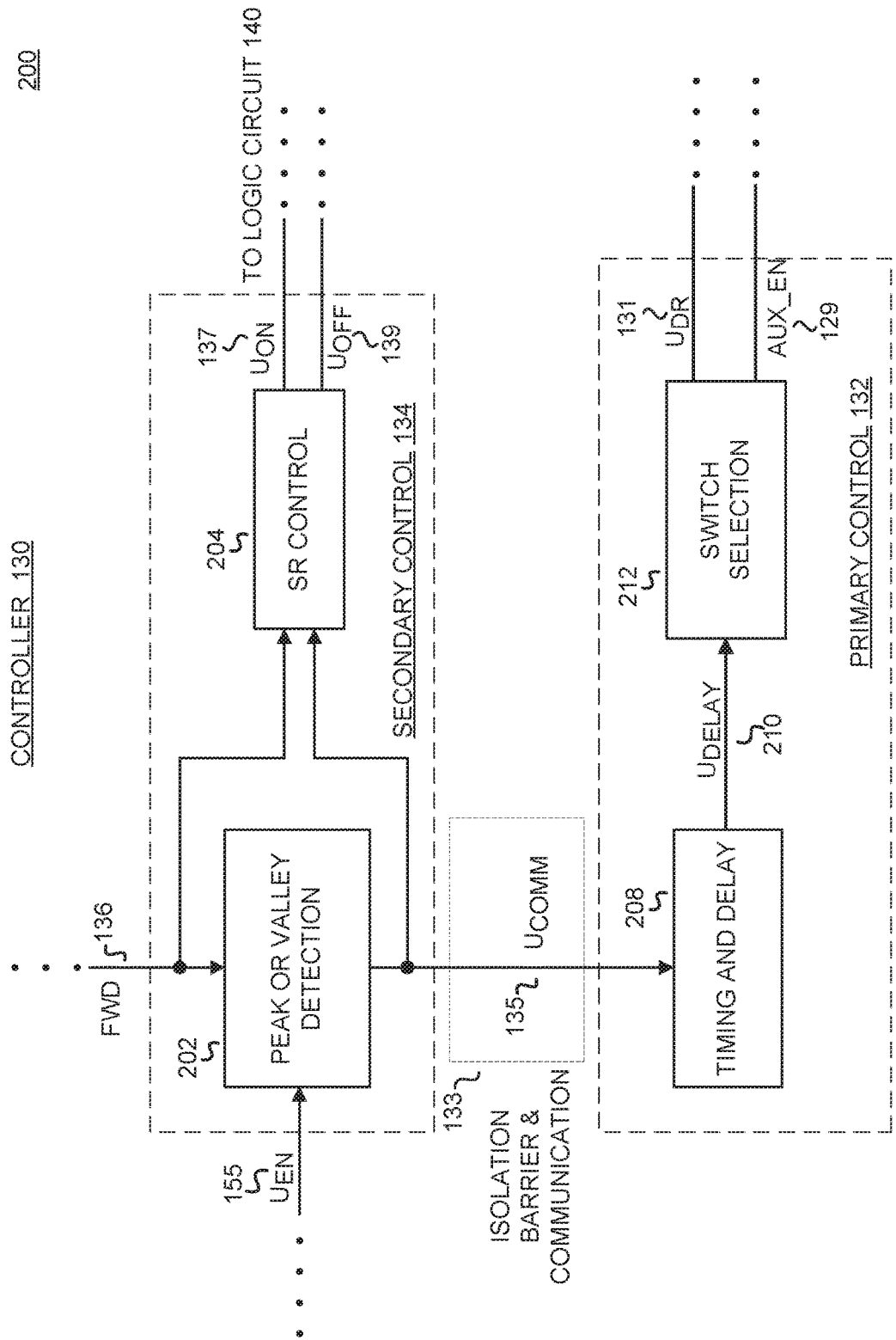
FIG. 2 shows an example implementation of a dual switching control unit included in the ZVS flyback converter of FIG. 1, in accordance with the teachings of the present invention.

To illustrate, FIG. 2 shows an example 200 of a controller 130 of FIG. 1 including a primary control circuit 132 and a secondary control circuit 134 in accordance with the teachings of the present invention. It is appreciated that that similarly named and numbered elements below may be coupled and function similar to as described above.

The secondary control circuit 134 is shown to include a peak or valley detection circuit 202 and an SR control circuit 204. The peak or valley detection circuit 202 is coupled to receive the FWD signal 136 and the enable signal $U_{EN}$ 155. The peak or valley detection circuit 202 is coupled to output the signal UCOMM 135. The SR control circuit 204 is also coupled to receive FWD signal 136 and the signal UCOMM 135. The SR control circuit 204 is coupled to output the signals $U_{ON}$ 137 and $U_{OFF}$ 139.

The primary control circuit 132 is shown to include a timing & delay circuit 208 and a switch selection circuit 212. The timing & delay circuit 208 is coupled to output a signal $U_{DELAY}$ 210 to the switch selection circuit 212. The switch selection circuit 212 is coupled to output the main switch drive signal $U_{DR}$ 131 and the auxiliary enable signal AUX_EN 129.

In one example, the secondary control circuit 134 makes the signal $U_{COMM}$ 135 high in response to detecting a valley point on the signal FWD 136 in accordance with the teachings of the present invention. A high value of $U_{COMM}$ 135 further enables the timing & delay circuit to make the signal $U_{DELAY}$ 210 high. If the signal $U_{DELAY}$ 210 is high, then the switch selection circuit 212 may make the signal AUX_EN 129 high and may delay outputting a high value on the signal $U_{DR}$ 131. In other words, after receiving a switch turn on command from the secondary control circuit 134, the primary control circuit 132 may delay the turning on of the main switch S1 116. Furthermore, the primary control circuit 132 may turn on the auxiliary switch S2 126 before turning on the main switch S1 116. Furthermore, the primary control circuit 132 may turn off the auxiliary switch S2 126 after a predetermined delay as suitable to the design parameters, before turning on the main switch S1 116.

Figure 3:
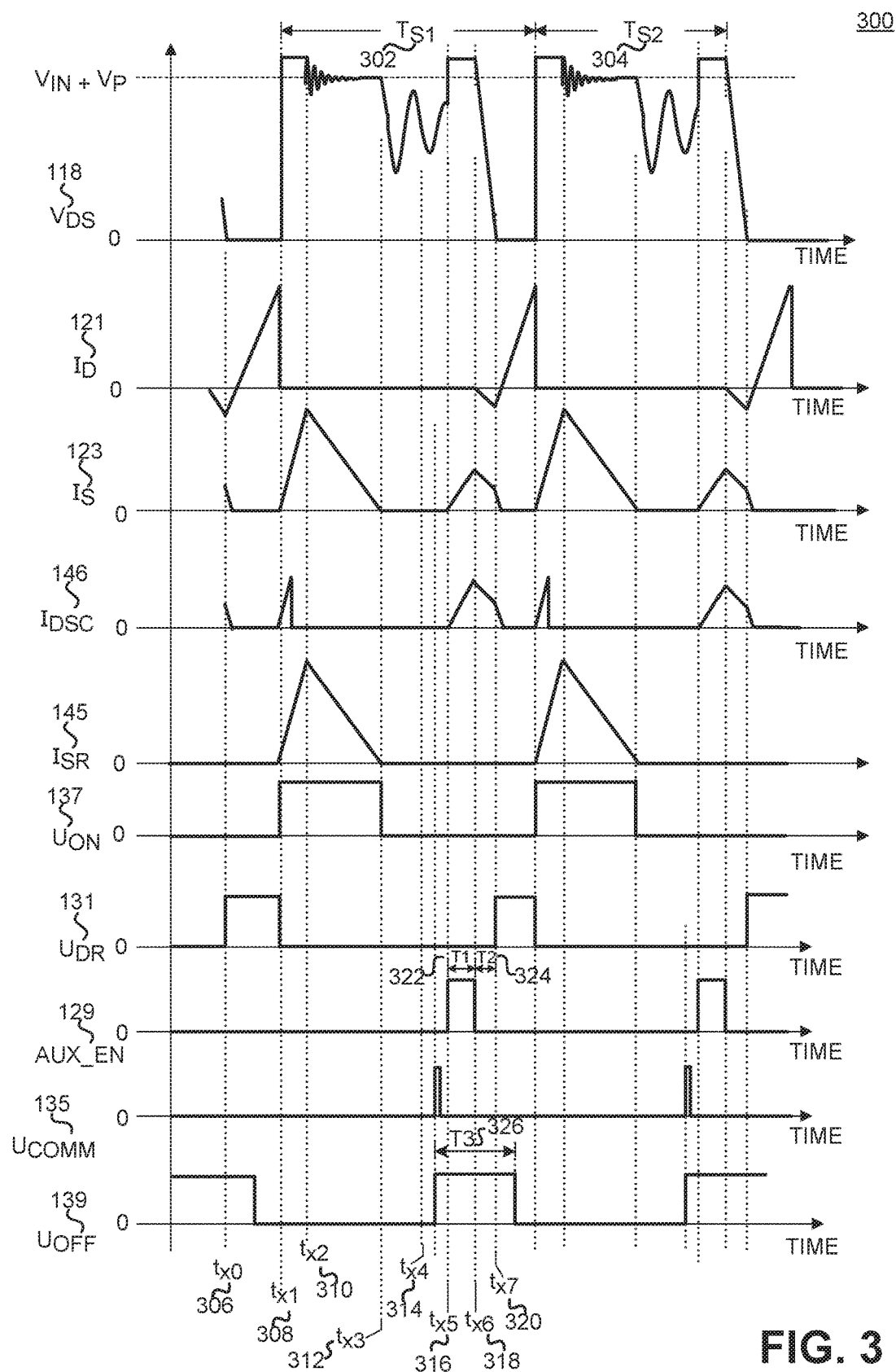
FIG. 3 illustrates example waveforms of a Zero Voltage Switching (ZVS) flyback converter of FIG. 1 operating in Discontinuous Conduction Mode (DCM), in accordance with the teachings of the present invention.

FIG. 3 shows example waveforms of a Zero Voltage Switching (ZVS) flyback converter of FIG. 1 operating in Discontinuous Conduction Mode (CCM) when the control of a Sync Rectifier (SR) is implemented per teachings in this invention to reduce the voltage stress on the Sync Rectifier (SR).

Two complete switching cycles $T_{S1}$ 302 and $T_{S2}$ 304 have been illustrated in FIG. 3. As can be seen at time $t_{x0}$ 306, the primary control circuit 132 turns on the primary switch S1 116, signal $U_{DR}$ 131 becomes high, and the drain voltage $V_{DS}$ 118 of primary switch S1 116, decreases substantially to zero. The primary switch drain current $I_D$ 121 starts to increase. The secondary current $I_S$ 123 starts to rapidly decrease toward zero. When the driving of the SR 142 is implemented according to the teaching of this invention, the SR 142 is disabled from turning-on substantially before time $t_{x0}$ 306 and the current $I_{SR}$ 144 through SR 142 is very small and substantially zero. Substantially all of the secondary current $I_S$ 123 flows through the Schottky diode $D_{SC}$ 145 at time $t_{x0}$ 306. Therefore, the Schottky diode $D_{SC}$ 145 is exposed to a reverse recovery process during a short period of time after time $t_{x0}$ 306. Due to a very small value of current $I_{SR}$ 144 through SR 142, which is substantially zero, the body diode of the SR 142 is not exposed to substantial reverse recovery losses during a short period of time after the time $t_{x0}$ 306. It may be appreciated that the Schottky diodes in general have a much better reverse recovery behavior and lesser losses than the body diode of the MOSFET transistors used as synchronous rectifiers. In accordance with the teachings of the present invention, the secondary current from the SR 142 is redirected to the Schottky diode $D_{SC}$ 145 prior to time $t_{x0}$ 306.

Between the times, $t_{x0}$ 306 and $t_{x1}$ 308, the signal $U_{DR}$ 131 is high turning on the primary switch S1 116. The drain voltage of Q1 117 is substantially zero. The switch current $I_D$ 121 is increasing. The secondary current $I_S$ 123, redirected to the Schottky diode $D_{SC}$ 145 becomes substantially zero in a short time after $t_{x0}$ 306.

At time $t_{x1}$ 308, the primary control circuit 132 turns off the primary switch S1 116 by making the signal $U_{DR}$ 131 becomes low and the drain voltage of primary switch $V_{DS}$ 118 begins to increase rapidly. The primary switch current $I_D$ 121 decreases substantially to zero. The secondary current $I_S$ 123 is still near zero, but gradually starts to increase and flows through the Schottky diode $D_{SC}$ 145 (depicted as current $I_{DSC}$ 146) and the body diode of the SR 142 (depicted as secondary rectifier current $I_{SR}$ 144). The current through the body diode D2 125 of auxiliary switch Q2 127 starts to flow when voltage $V_{DS}$ 118 reaches a value which is equal to sum of input voltage $V_{IN}$ 102 and voltage on the clamp capacitor $C_{CL}$ 109. The peak current through body diode D2 125 of auxiliary switch Q2 127 is slightly lower than peak current of primary switch drain current $I_D$ 121 at turn off time.

Between $t_{x1}$ 308 and $t_{x2}$ 310, the primary switch S1 116 is off as signal $U_{DR}$ 131 is low and the drain voltage of the primary switch $V_{DS}$ 118 is substantially equal to the sum of the input voltage $V_{IN}$ 102 and voltage on the clamp capacitor $C_{CL}$ 109. The primary switch drain current $I_D$ 121 is substantially zero. The secondary current $I_S$ 123, which flows as a current through secondary rectifier $I_{SR}$ 144 and as current through the Schottky diode $D_{SC}$ 145 (depicted as current $I_{DSC}$ 146), is increasing. Current flows through body diode D2 125 of auxiliary switch Q2 127 and starts to decrease from its peak value, which is slightly lower than peak current of primary switch drain current $I_D$ 121 at turn off time, toward zero. The rate of decrease of current through the body diode D2 125 of auxiliary switch Q2 127 may be determined by the voltage on clamp capacitor $C_{CL}$ 109 and the leakage inductance of the transformer T1 104.

It may be appreciated that at this time, the energy stored in the leakage inductance of the transformer T1 104 is being transferred into the energy in the clamp capacitor $C_{CL}$ 109. Soon after time $t_{X1}$ 308, the SR controller 204 may sense the presence of current through secondary rectifier $I_{SR}$ 144, and may set the signal $U_{ON}$ 137 to high level. A high value of the signal $U_{ON}$ 137 may result in making the control signal $U_{SR}$ 138 high, which turns on the SR 142, and substantially all secondary current $I_S$ 123 start to flow through SR 142. In other examples, a low value of $U_{SR}$ 138 may turn on SR 142.

At time $t_{X2}$ 310, signal $U_{DR}$ 131 is low, the primary switch S1 116 is off. The drain voltage of primary switch $V_{DS}$ 118 is substantially the sum of input voltage $V_{IN}$ 102 and voltage on clamp capacitor $C_{CL}$ 109 but quickly decreases to the value equal to the sum of input voltage $V_{IN}$ 102 and reflected voltage $V_P$ 108. The primary switch drain current $I_D$ 121 is zero. The current through secondary rectifier $I_{SR}$ 144 increases to its maximum value. The current through body diode D2 125 of auxiliary switch Q2 127 reaches zero. The SR FET Q3 143 is turned on via the control signal $U_{SR}$ 138. Also at this time, the energy stored in the leakage inductance of the transformer T1 104 is substantially transferred into energy on the clamp capacitor $C_{CL}$ 109.

Between $t_{X2}$ 310 and $t_{X3}$ 312, the primary switch S1 116 is off, the signal $U_{DR}$ 131 is low, the drain voltage of primary switch $V_{DS}$ 118 is sum of input voltage $V_{IN}$ 102 and reflected voltage VP 108. The primary switch drain current $I_D$ 121 is 0 A. The current through secondary rectifier $I_{SR}$ 144 is decreasing from its maximum value toward 0 A. The current through body diode D2 125 of auxiliary switch Q2 127 is 0 A. The SR FET Q3 143 is turned on with control signal $U_{SR}$ 138.

At time $t_{X3}$ 312, the current through secondary rectifier $I_{SR}$ 144 reaches zero and the secondary controller turns off the SR FET Q3 143 via control signal $U_{SR}$ 138.

Between $t_{X3}$ 312 and $t_{X4}$ 314, the drain voltage of primary switch $V_{DS}$ 118 resonates around value of input voltage $V_{IN}$ 102 with the amplitude which is equal to the voltage on the clamp capacitor $C_{CL}$ 109 at the beginning and decays over time. The frequency of this resonant oscillation is substantially equal to the sum of the leakage and magnetizing inductances of transformer 104 and effective drain capacitance $C_P$ 124. The current through secondary rectifier $I_{SR}$ 144 is zero and the SR FET Q3 143 is off.

At time $t_{X4}$ 314, the secondary control circuit 134 may detect the need for another switching cycle from the primary side in response to sensing the output voltage being lower than a predetermined regulated value. However, per teachings of this invention, in one example, the secondary control circuit 134 may detect a valley zone of operation and may not immediately send a request to the primary controller for another switching cycle. More specifically, but will wait to the time when the drain voltage of primary switch $V_{DS}$ 118 is close to the peak value to reduce the turn on losses of the auxiliary FET Q2 127.

Per one of the teachings of this invention, the secondary control circuit 134 will wait until the voltage on the FWD signal 136 approached a valley point (drain voltage of main switch S1 116 approached a peak point) to a request to the primary controller for another switching cycle from the primary through signal $U_{COMM}$ 135 at a time immediately before time $t_{X5}$ 316.

Per one of the teachings of this invention, the secondary control circuit 134 may prevent the SR 142 from turning on during the time T3 326. Secondary control circuit 134 may send a request to the primary controller for another switching cycle from via the signal $U_{COMM}$ 135 at a time just before the time $t_{X5}$ 316. As can be seen, the time duration T3 326 is greater than the sum of the times durations T1 322 and T2 324. Thus, in one example the SR FET 142 is off from a time before the auxiliary S2 126 is turned on until the after the SR FET 142 is off and the primary switch S1 116 is turned on. In one example, the time duration T3 326 may be predetermined by the secondary control circuit 134 at a fixed or a programmable value. In some examples the time duration T3 326 may be determined by the secondary control circuit 134 in response to a programmable input coupled to receive an electrical parameter such as a resistive or capacitive or other.

At time $t_{X5}$ 316, the primary control circuit 132 may receive a request for another switching cycle via signal $U_{COMM}$ 135. Soon after time $t_{X5}$ 316, the primary control circuit 132 may make the control signal AUX_EN 129 high and the auxiliary control circuit 128 may turn on the auxiliary FET Q2 127 via the signal $U_{AUX}$ 111.

It is important to note that, per one teaching of this invention, FET Q2 127 in the auxiliary switch 126 turns on at a time when the voltage across FET Q2 127 in the auxiliary switch 126 is at its minimum and the turn on losses are minimal.

It may be appreciated that the turn on losses of the auxiliary FET Q2 127 can be determined from voltage across auxiliary FET Q2 127 and the effective capacitance $C_P$ 124.

At time $t_{X5}$ 316 the auxiliary FET Q2 127 is turned on and remains on until time $t_{X6}$ 318, in other words the auxiliary FET Q2 127 is on for the duration of T1 322. Time duration T1 322 may be determined by the primary control circuit 132. In other examples, the time duration T1 322 may be predetermined by the primary control circuit 132 at a fixed or a programmable value. In one example the time duration T1 322 may be determined by the primary control circuit 132 in response to a programmable input coupled to receive an electrical parameter such as a resistive or capacitive or other.

Between $t_{X5}$ 316 and $t_{X5}$ 316, the current through auxiliary switch Q2 is increasing from zero toward its maximum value. The current through leakage inductance of the transformer is increasing from zero toward its maximum value. The secondary current $I_S$ 123 is increasing. During this time, the SR FET Q3 143 is prevented from turning on to reduce the reverse recovery losses of the body diode of the SR FET Q3 143.

Since the SR FET Q3 143 is prevented from turning on during the time T3 326, per teaching of this invention, the secondary current $I_S$ 123 flows through the Schottky diode $D_{SC}$ 145 (depicted as current $I_{DSC}$ 146).

It may be appreciated that during the time T3 326, the energy from the clamp capacitor $C_{CL}$ 109 is being transferred to the secondary. In other words, a portion of the energy in the leakage inductance of transformer 104 is being recycled rather than dissipated. Also during this time, the current through leakage inductance of transformer 104 is increasing. The increase in the leakage inductance current may cause an energy built-up in the leakage inductance of transformer 104, which may later be used to discharge the voltage on capacitance $C_P$ 124 to further ensure Zero Voltage Switching (ZVS) of the primary switch S1 116.

At time $t_{X6}$ 318, the primary control circuit 132 may make the control signal AUX_EN 129 low in response to which the auxiliary FET Q2 127 may be turned off.

Between $t_{X6}$ 318 and $t_{X7}$ 320, the auxiliary FET Q2 127 is off, the primary switch S1 116 is off, the current through leakage inductance of transformer 104 is resonating down, and the energy in the leakage inductance of transformer 104 is discharging the voltage on capacitor $C_P$ 124. The drain voltage of primary switch $V_{DS}$ 118 is also resonating down from its peak value (equal to the sum of input voltage $V_{IN}$ 102 and voltage on clamp capacitor $C_{CL}$ 109) toward zero. The resonant frequency may be determined from the leakage inductance of the transformer 104 and effective drain capacitance $C_P$ 124. The current through auxiliary switch Q2 127 is nearly zero. The secondary current $I_S$ 123, which flows through the Schottky diode $D_{SC}$ 145 (depicted as current $I_{DSC}$ 146) is just slightly decreasing; it stays substantially close to its value at time $t_{X6}$ 318.

At time $t_{X7}$ 320, the drain voltage of primary switch $V_{DS}$ 118 reaches substantially zero, or some low value close to zero. Primary controller 134 turns on the primary switch S1 116 by making the signal $U_{DR}$ 131 high. After time $t_{X7}$ 320 the process repeats as previously described in a new switching cycle.

The time duration from $t_{X6}$ 318, when the auxiliary switch S2 126 turns off, until time $t_{X7}$ 320, when the primary switch S1 116 turns on, may be referred to as time T2 324. Time duration T2 324 may be determined by the primary control circuit 132. In one example time duration T2 324 may be programmed in the primary control 132 as a fixed value. In some examples, time duration T2 324 may be determined by the primary control 132 in response to a programmable input coupled to receive an electrical parameter such as a resistive or capacitive or other.

In one example, time T2 324 can be automatically determined by the primary control 132, The primary control 132 can monitor the voltage $V_{DS}$ 118 across main switch 116 after setting the AUX_EN 129 (check number when update drawings) signal to low and, when the voltage $V_{DS}$ 118 across main switch 116 drops to low value, the primary control may turn on the main switch 116. Thus, the time T2 324 is automatically determined by the primary control 132.

It may be seen that time duration T3 326 starts before time $t_{X5}$ 316 (when the request for the next switching cycle is sent) and lasts until after time $t_{X7}$ 320 (when the primary switch S1 116 turns on), per teaching of this invention. This way, during the time $t_{X5}$ 316 to $t_{X6}$ 318, the current through SR FET 142 is substantially zero, and the current through diode $D_{SC}$ 145 increases to almost a maximum value of the secondary current $I_S$ 123. As can be appreciated by one of ordinary skill in the art, this is due to the fact that the diode $D_{SC}$ 145 has a lower forward voltage drop than the body diode D3 141 of SR FET Q3 143. As can be seen, at time $t_{X7}$ 320 (when the primary switch S1 116 turns on) the current through diode $D_{SC}$ 145 decreases substantially to zero.

Thus, diode $D_{SC}$ 145 will be exposed to a reverse recovery effect with high current, while the body diode D3 141 of SR FET Q3 143 will be exposed to a reverse recovery effect with very low current or substantially zero current.

Since diode $D_{SC}$ 145 has by far better reverse recovery behavior then the body diode D3 141 of SR FET Q3 143, the current spike on primary switch will be lower and the voltage spike on the secondary rectifier, when diode $D_{SC}$ 145 recovers, will be smaller.

Thus, by preventing the turn-on of SR FET 142 and redirecting the secondary current through diode $D_{SC}$ 145 during the times from $t_{X5}$ 316 to $t_{X6}$ 318 the conduction losses in the SR FET 142 are reduced, but the overall conduction losses of the secondary rectifiers are increased. This is because the diode $D_{SC}$ 145 has higher forward voltage drop than the voltage drop across the body SR FET Q3 143 if it was kept in an on state. However, the diode $D_{SC}$ 145 has better reverse recovery behavior than the body diode D3 141 of the SR FET Q143. It may be further proven by laboratory measurements that when operated as explained above, the voltage stress on the SR FET Q3 143 is appreciably smaller. Immediately after time $t_{X7}$ 320, the voltage across the SR FET Q3 143 is still slightly negative.

In one example, the SR control circuit 204 (shown in FIG. 2) may turn on the SR 142, in response to the voltage across the SR 142, which is substantially the voltage on the FWD signal 136. In one example, the SR control circuit 204 may turn on the SR 142 voltage on the FWD signal 136 is at non-zero negative value.

It may be further appreciated that if the SR 142 is not prevented from turning on immediately after time $t_{X7}$ 320, the SR control circuit 204 turn on the SR 142 which may cause cross-conduction of the primary switch S1 116 and the SR 142. However, per teaching of this invention, the SR 142 is kept off or prevented from turning on past the time $t_{X7}$ 320, allows SR 142 has enough time to recover until the voltage on the FWD signal 136 signal becomes nonzero positive. Thus, per teaching of this invention, cross-conduction is avoided.

Figure 4:
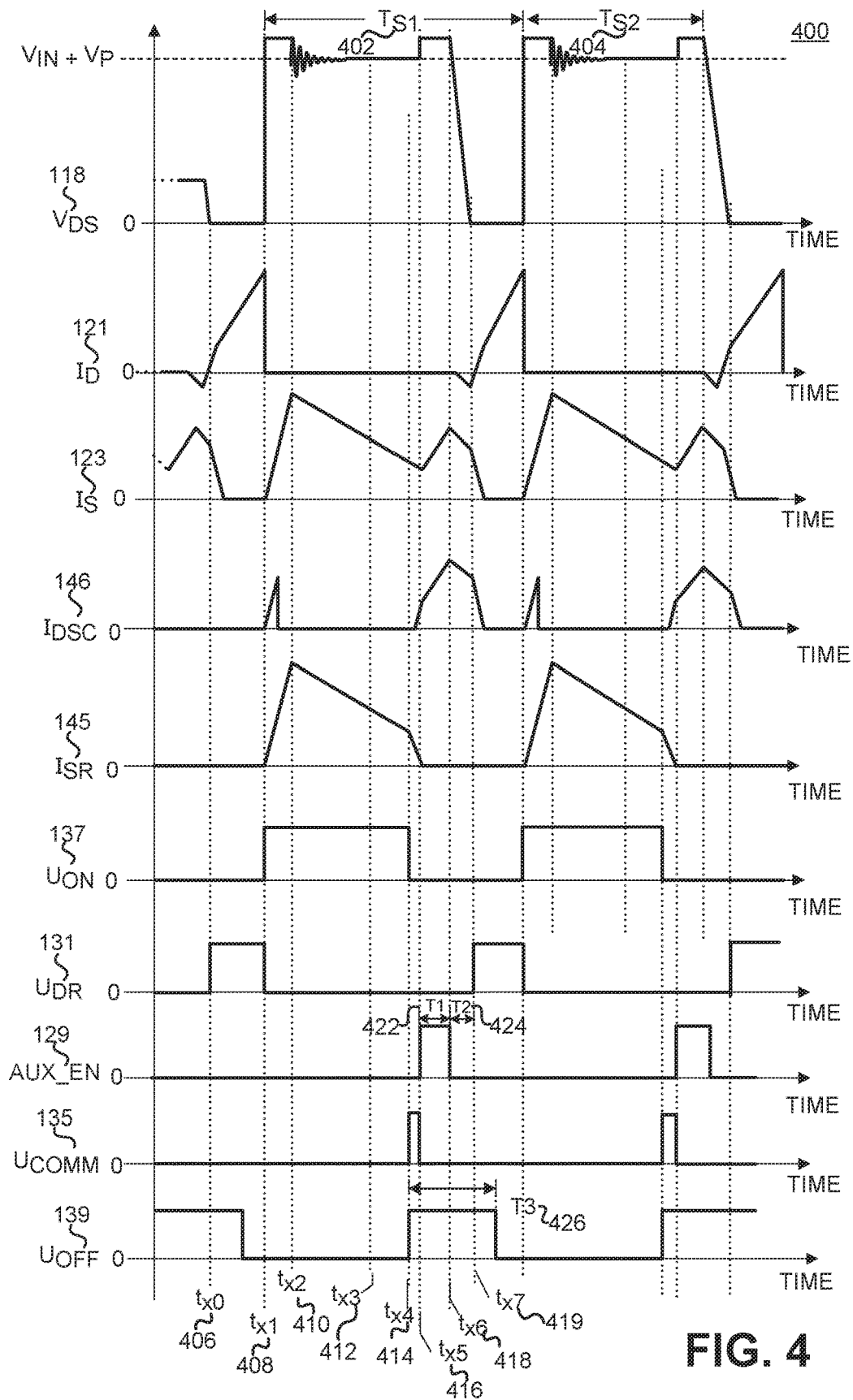
FIG. 4 illustrates example waveforms of a Zero Voltage Switching (ZVS) flyback converter of FIG. 1 operating in Continuous Conduction Mode (CCM), in accordance with the teachings of the present invention.

FIG. 4 shows example waveforms of a Zero Voltage Switching (ZVS) flyback converter of FIG. 1 operating in Continuous Conduction Mode (CCM) when the control of a Sync Rectifier (SR) is implemented per teachings in this invention to reduce the voltage stress on the Sync Rectifier (SR).

One difference between the DCM and CCM is that when the power converter 100 in FIG. 1 operates in CCM, there is energy in energy transfer element T1 104 during the entire time that primary switch S1 116 is open (turned off). In other words, there is energy in energy transfer element T1 104 when primary switch S1 116 initially closes (turned on).

When the power converter 100 in FIG. 1 operates in CCM,

Two complete switching cycles $T_{S1}$ 402 and $T_{S2}$ 404 have been illustrated in FIG. 4. All the signals shown in the waveforms of FIG. 4 behave similarly as discussed with respect to FIG. 3. A difference between the FIG. 4 waveforms and FIG. 3 waveforms can be seen at time $t_{X4}$ 414. At this time, the secondary current $I_S$ 123 has a value greater than zero, and flows through SR FET Q3 143. At this time, the secondary control circuit 134 may send a request for another switching cycle via signal $U_{COMM}$ 135 immediately. At the same time, the secondary control circuit 134 may turn off the SR FET Q3 143 immediately. Once the SR FET Q3 143 is turned-off, the secondary current $I_S$ 123 starts to flow through the diode $D_{SC}$ 145 and the current through the SR FET Q3 143 is decreasing to substantially zero. After time $t_{X5}$ 416 the waveforms of FIG. 4 behave similarly as discussed with respect to FIG. 3.

Figure 5:
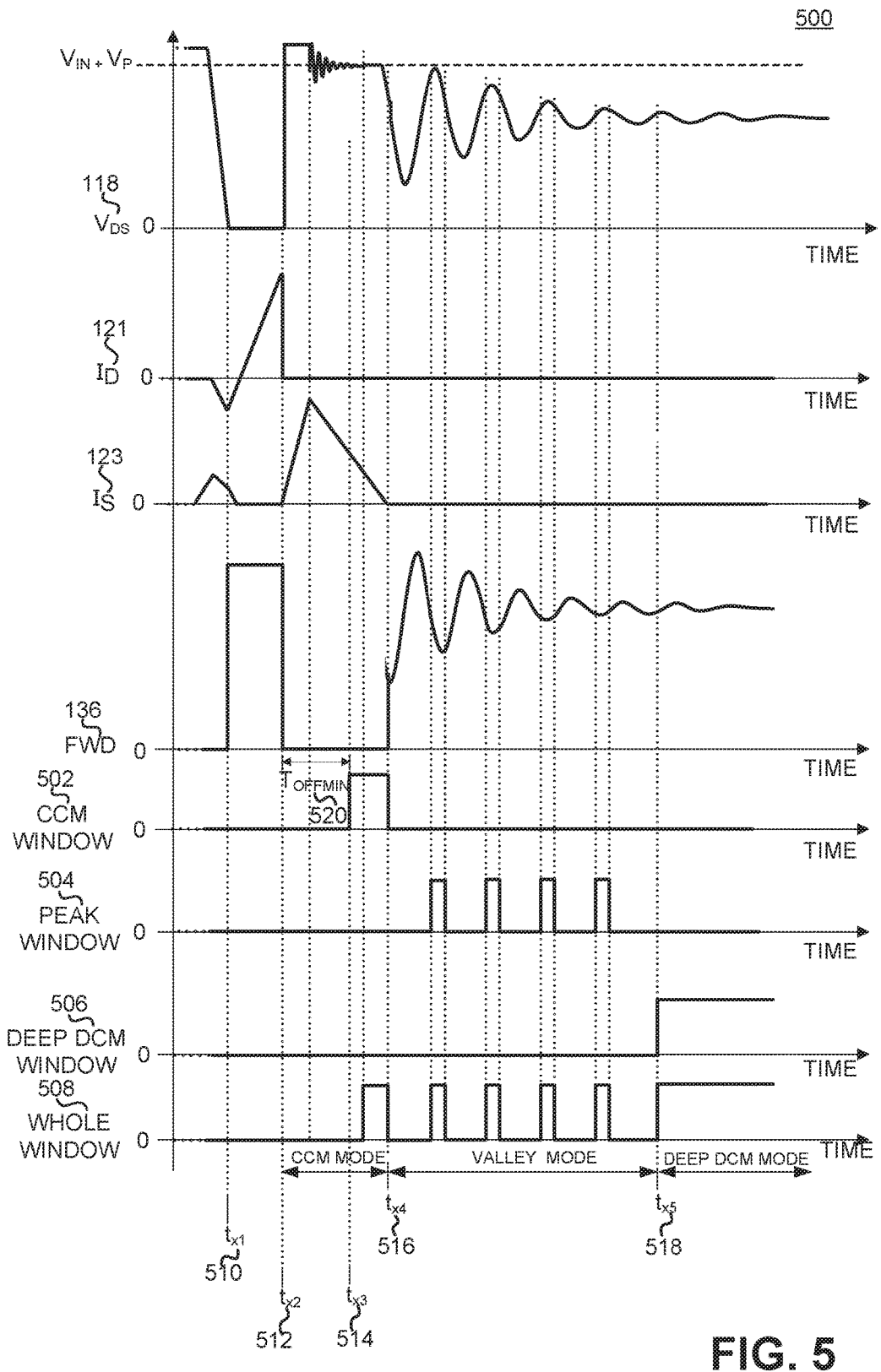
FIG. 5 illustrates example waveforms of a Zero Voltage Switching (ZVS) flyback converter depicting optimal times for turning on of an auxiliary switch over different operating conditions, in accordance with the teachings of the present invention.

FIG. 5 illustrates example waveforms of a Zero Voltage Switching (ZVS) converter of FIG. 1 with optimal times for turning on of the auxiliary switch S2 126 over different operating conditions, in accordance with the teachings of the present invention.

The waveform $V_{DS}$ 118 illustrates the of the drain voltage of the primary switch S1 116 over a switching cycle of the power converter 100 of FIG. 1.

The waveform $I_D$ 121 illustrates drain current of the primary switch S1 116 over a switching cycle of power converter 100 of FIG. 1.

The waveform $I_S$ 123 illustrates secondary current of the transformer T1 104 over a switching cycle of power converter 100 of FIG. 1.

The waveform FWD 136 illustrates the drain voltage of the SR 142 over a switching cycle of power converter 100 of FIG. 1.

The waveforms "CCM WINDOW 502", "PEAK WINDOW 504" and "DEEP DCM WINDOW 506" illustrate example time intervals when the secondary control circuit 134 may send the request UCOMM 135 to the primary control circuit 132 to generate the signal AUX_EN to turn on the auxiliary switch S2 126. A high value of either signal "CCM WINDOW 502" or "PEAK WINDOW 504" or "DEEP DCM WINDOW 506" illustrates example intervals when the secondary control 134 may send the request $U_{COMM}$ 135 to the primary control 132 to generate signal AUX_EN and turn on the auxiliary switch 126. The signal "WHOLE WINDOW 508" is logical OR function of signals "CCM WINDOW 502", "PEAK WINDOW 504" and "DEEP DCM WINDOW 506". It may be appreciated that in other examples, the whole window signal 508 may be generated by using any other combinational logic circuit or alternative methods.

In one example, the secondary control circuit 134 sends a request via signal $U_{COMM}$ 135 to the primary control 132 to make the signal AUX_EN high or low in response to the $U_{EN}$ 155. In general in one example, the primary switch S1 116 is turned on if the signal $U_{EN}$ 155 is high and turned off signal if $U_{EN}$ 155 is low. In other examples, the primary switch S1 116 may be turned on if the signal $U_{EN}$ 155 is low and turned off signal if $U_{EN}$ 155 is high. Also as explained earlier, the enable circuit 154 may make the signal $U_{EN}$ 155 high in response to the signal $U_{FB}$ 153. In one example, the enable circuit 154 may make a request for a new switching cycle in response to the signal $U_{FB}$ 153.

From time $t_{X1}$ 510 until time $t_{X2}$ 512 the primary switch S1 116 is on as the enable circuit 154 makes a request for a new switching cycle. The auxiliary switch S2 126 may be turned on after time $t_{X3}$ 514 per one teaching of this invention.

From time $t_{X2}$ 512 to time $t_{X3}$ 514, when the primary switch S1 116 is off, the secondary control circuit 134 may send a request to the primary control circuit 132 via the signal $U_{COMM}$ 135 to make the signal AUX_EN 129 high to turn on the auxiliary switch 126 after time $t_{X3}$ 514, per teaching of this invention. The secondary control circuit 134 may wait until the time $T_{OFFMIN}$ 520 elapses before sending a request to the primary control circuit 132.

In one example, the time $T_{OFFMIN}$ 520 may be chosen to limit the maximum switching frequency of the converter. In other examples, the time $T_{OFFMIN}$ 520 may be chosen, to improve noise immunity of the SR control circuit 204.

From time $t_{X3}$ 514 to time $t_{X4}$ 516, when the primary switch S1 116 is off, if the enable circuit 154 makes a request for a new switching cycle during this time, the secondary control circuit 134 may make a request to the primary control circuit 132 to make signal AUX_EN 129 high to turn on the auxiliary switch 126 immediately. The signal "CCM WINDOW 502" is high from $t_{X3}$ 514 and $t_{X4}$ 516 indicating that the secondary control circuit 134 may send a request to the primary control 132 immediately during this time.

From time $t_{X4}$ 516 to time $t_{X5}$ 518 when the primary switch 116 is still off, the secondary current $I_D$ 123 may be substantially zero. The drain voltage $V_{DS}$ 118 of the primary switch S1 116 may resonate around value of the input voltage $V_{IN}$ 102. The drain voltage $V_{DS}$ 118 may have an initial value equal to the voltage on the clamp capacitor $C_{CL}$ 109 but may decrease over time. The frequency of this resonant oscillation may be determined by the sum of the leakage and magnetizing inductances of transformer T1 104 and effective drain capacitance $C_P$ 124. The drain voltage of SR 142 is substantially equal to the voltage on signal FWD, which may also resonate at substantially the same frequency as voltage $V_{DS}$ 118. However, the signal FWD 136 may be out of the phase with respect to the $V_{DS}$ 118. Additionally, the valley of the FWD 136 signal may correspond with the peak of the $V_{DS}$ 118.

From time $t_{X4}$ 516 to time $t_{X5}$ 518, the secondary control circuit may detect the valleys of the signal FWD 136. The secondary control circuit 134 may make the signal PEAK WINDOW 504 high, as the signal FWD 136 approaches valley point until it is near the valley point.

If the enable circuit 154 generates the request for a new switching cycle during this time, then the secondary control 134 may send a request to the primary control circuit 132 to turn on the auxiliary switch 126 only at the times when the signal "PEAK WINDOW 504" is high. Thus, the auxiliary switch S2 126 may be turned on when the voltage $V_{DS}$ 118 is at its peak and the voltage across auxiliary switch 126 is at a minimum value; thus the turn on losses of the auxiliary switch 126 may also be minimized.

In one example, the secondary control 134 may be programmed to be sensitive to lower and higher thresholds of voltages of the FWD signal 136 to be considered as valleys. These thresholds may also be referred to as valley thresholds. In one example, the valley thresholds may be set in response to a predetermined time also referred to as valley detect time. An example of the valley detect time can be seen in FIG. 5 from $t_{X4}$ 516 to $t_{X5}$ 518. In one example, the valley detect time may be a fixed or programmable time set in the secondary controller 134. In some examples, the valley detect time may be implemented by counting the number of valleys of the FWD signal 136 starting from the time when the primary switch S1 is turned off.

At time $t_{X5}$ 518, the secondary control may make the signal "DEEP DCM WINDOW 506" high. If the enable circuit 154 make the request for a new switching cycle after time $t_{X5}$ 518, the secondary control circuit 134 may send a request to the primary control 132 to turn on the auxiliary switch 126 immediately.

Figure 6:
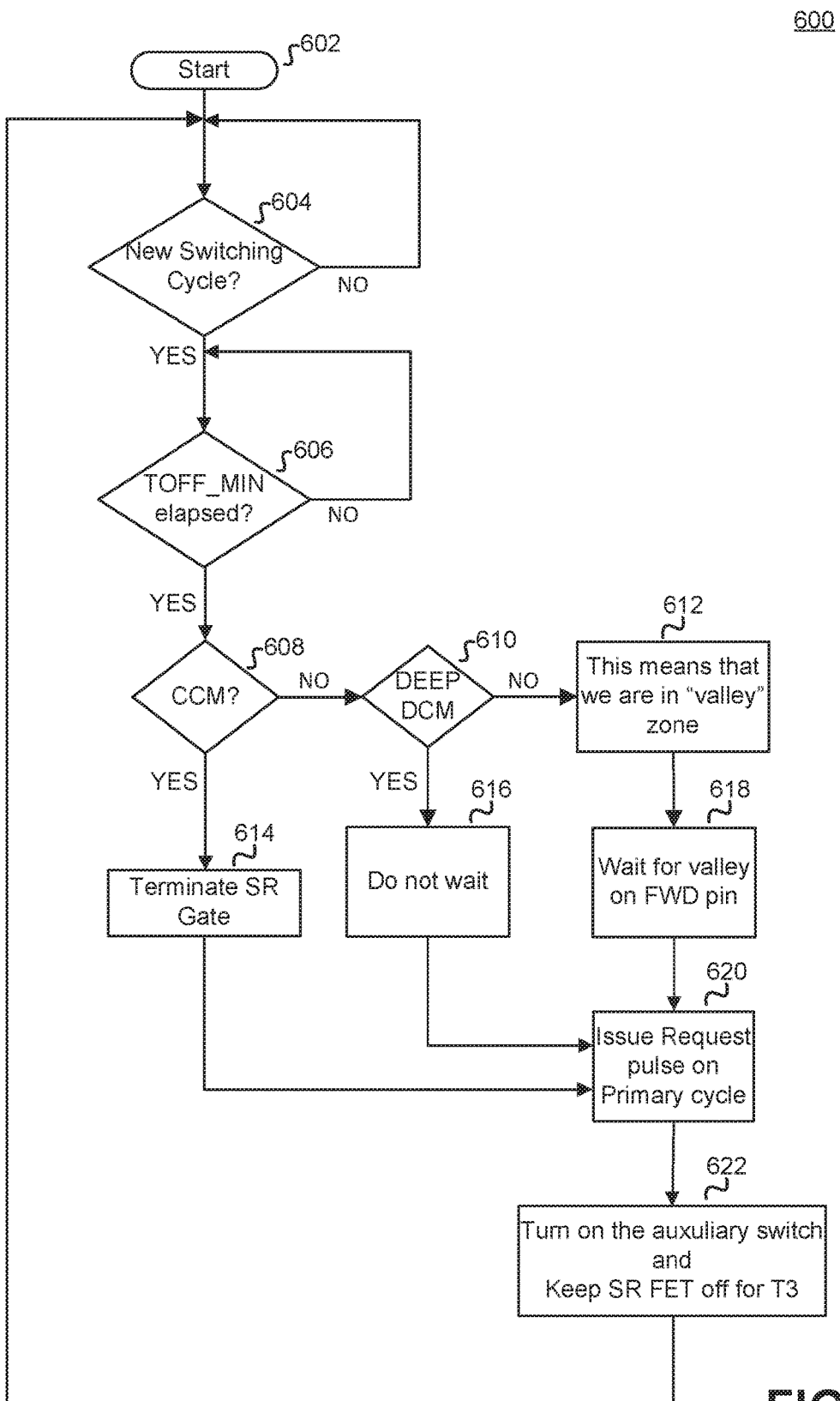
FIG. 6 is an example flow diagram of the ZVS flyback converter of FIG. 1 operating in CCM and DCM, in accordance with the teachings of the present invention.

FIG. 6 illustrates an example flow diagram of the ZVS flyback converter of FIG. 1 in accordance with the teachings of the present invention.

After starting at block 602, it is checked at 604 if a request for a new switching cycle is requested or not. The request for new switching cycle may come, in one example, from the enable circuit 154. If there is requested then the process proceeds to block 606 otherwise the process goes back to the beginning of the block 602.

At block 606, it may be checked if a minimum off time of the switch has elapsed. The off time is time after the primary switch S1 116 is turned off and the energy is transferred to the secondary. The off time is hence off time of the switch S1 116, In one example, the secondary control 134 may inhibit the request until some minimum off time is elapsed to reduce overall switching frequency of the converter. If the minimum off time is elapsed, then the process proceeds to the block 608. If not, then the process goes back to the beginning of block 606.

At block 608, it may be checked if the power converter is operating in CCM or not. If so, then the process proceeds to the block 614 otherwise the process goes to the block 610.

At block 610, it may be checked if the power converter is operating in Deep DCM or not. If so, then the process proceeds to the block 616 otherwise the process goes to the block 612 and then to block 618.

At block 618, a valley zone of the voltage on the FWD signal 136 is detected. From here the process moves to the block 620.

At block 614, the SR 142 is turned off and then the process moves to the block 620.

From block 616, the process moves to the block 620 without any delay.

At block 620, the secondary control may send a command to turn the primary switch on via the signal $U_{COMM}$ 135. From here the process moves to the block 622.

At block 622, the SR 142 is turned off and the auxiliary switch S2 126 is turned on.

At the end of block 622, the process goes back to the beginning of block 604.

The order in which some or all of the process blocks appear in method 600 should not be deemed limiting. Rather, one of ordinary skill in the art having the benefit of the present disclosure will understand that some of the process blocks may be executed in a variety of orders not illustrated, or even in parallel.

The above description of illustrated examples of the present invention, including what is described in the Abstract, is not intended to be exhaustive or to be limiting to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, times, etc., are provided for explanation purposes and that other values may also be employed in other embodiments and examples in accordance with the teachings of the present disclosure.

What is claimed is:

1. A controller for use in a power converter having an energy transfer element for transferring energy between an input side and an output side of the power converter, wherein the power converter further includes a main switch coupled to an input side of the energy transfer element, an auxiliary switch coupled to the input side of the energy transfer element, and a synchronous rectifier coupled to the output side of the power converter, the controller comprising:
a first control circuit coupled to the input side of the power converter, wherein the first control circuit includes a timing and delay circuit and a switch selection circuit;
a second control circuit coupled to the output side of the power converter, wherein the second control circuit includes a valley detection circuit and a synchronous rectifier control circuit; and
a third control circuit coupled to the input side of the power converter, wherein the third control circuit is coupled to drive the auxiliary switch,
wherein the first control circuit is coupled to alternately drive the main switch and the auxiliary switch in response to a command signal to transfer energy from the input side to an output side of the energy transfer element to drive a load; and
wherein the synchronous rectifier control circuit is coupled to drive the synchronous rectifier from an ON state to an OFF state in response to a turning on an auxiliary switch from an OFF state to an ON state and keep the synchronous rectifier in an OFF time for programmed time to reduce reverse recovery losses and cross-conduction of the main switch and the synchronous rectifier.

2. The controller of claim 1, wherein the first control circuit is coupled to drive the auxiliary switch from an OFF state to an ON state in response to an auxiliary enable signal.

3. The controller of claim 2, wherein the third control circuit is coupled to drive the auxiliary switch from an OFF state to an ON state in response to a peak detection signal; wherein the peak detection signal has high value when the voltage across the main switch being at a maximum value.

4. The controller of claim 3, wherein the first control circuit is coupled to the third control circuit to drive the auxiliary switch from an ON state to an OFF state after a predetermined delay.

5. The controller of claim 1, wherein the first control circuit is coupled to drive the main switch from an OFF state to an ON state after a predetermined delay.

6. The controller of claim 1, wherein the synchronous rectifier control circuit is coupled to drive the synchronous rectifier from an ON state to an OFF state in response to a turning an auxiliary switch from an OFF state to an ON state.

7. A method of operating a regulated power converter, the power converter including:
an energy transfer element for transferring energy between an input side and an output side of the power converter;
a main switch coupled to the input side of the energy transfer element;
an auxiliary switch coupled to the input side of the energy transfer element;
a synchronous rectifier coupled to the output side of the converter; and
a controller, the controller including:
a first control circuit coupled to the input side of the power converter, the first control circuit including:
a timing and delay circuit; and
a switch selection circuit;
a second control circuit coupled to the output side of the power converter, the second control circuit including:
a valley detection circuit; and
a synchronous rectifier control circuit; and
a third control circuit coupled to the input side of the power converter, the third control circuit coupled to drive the auxiliary switch, wherein the method comprises:
driving the auxiliary switch to an ON state from an OFF state in response to a command signal from the second control circuit;
driving the auxiliary switch to the OFF state from the ON state after a predetermined delay; and
driving the main switch from an OFF state to an ON state in response to the auxiliary switch being in the OFF state in order to drive a load coupled to the output of the power converter.

8. The method of claim 7, further comprising driving with the third control circuit the auxiliary switch from the OFF state to the ON state after detecting a maximum value of the voltage across the main switch.

9. The method of claim 7, wherein the first control circuit is coupled to the third control circuit to drive auxiliary switch from an ON state to an OFF state after a predetermined delay.

10. A controller for use in a power converter having an energy transfer element for transferring energy between an input side and an output side of the power converter, wherein the power converter further includes a main switch coupled to an input side of the energy transfer element, an auxiliary switch coupled to the input side of the energy transfer element, and a synchronous rectifier coupled to the output side of the power converter, the controller comprising:
- a first control circuit coupled to the input side of the power converter, wherein the first control circuit includes a timing and delay circuit and a switch selection circuit;
- a second control circuit coupled to the output side of the power converter, wherein the second control circuit includes a valley detection circuit and a synchronous rectifier control circuit; and
- a third control circuit coupled to the input side of the power converter, wherein the third control circuit is coupled to drive the auxiliary switch,
- wherein the first control circuit is coupled to alternately drive the main switch and the auxiliary switch in response to a command signal to transfer energy from the input side to an output side of the energy transfer element to drive a load;
- wherein the first control circuit is coupled to drive the auxiliary switch from an OFF state to an ON state in response to an auxiliary enable signal;
- wherein the first control circuit is coupled to the third control circuit to drive the auxiliary switch from an ON state to an OFF state after a predetermined delay; and
- wherein the third control circuit is coupled to drive the auxiliary switch from an OFF state to an ON state in response to a peak detection signal; wherein the peak detection signal has high value when the voltage across the main switch being at a maximum value.

11. The controller of claim 10, wherein the first control circuit is coupled to drive the main switch from an OFF state to an ON state after a predetermined delay.

12. The controller of claim 10, wherein the synchronous rectifier control circuit is coupled to drive the synchronous rectifier from an ON state to an OFF state in response to a turning an auxiliary switch from an OFF state to an ON state.

13. The controller of claim 10, where in the synchronous rectifier control circuit is coupled to drive the synchronous rectifier from an ON state to an OFF state in response to a turning on an auxiliary switch from an OFF state to an ON state and keep the synchronous rectifier in an OFF time for programmed time to reduce reverse recovery losses and cross-conduction of the main switch and the synchronous rectifier.

* * * * *